United States Patent
Stroeks et al.

(10) Patent No.: US 9,243,109 B2
(45) Date of Patent: Jan. 26, 2016

(54) BI-AXIALLY STRETCHED PRODUCT

(75) Inventors: Alexander Antonius Marie Stroeks, Echt (NL); Katarina Tomic, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/130,148

(22) PCT Filed: Jun. 28, 2012

(86) PCT No.: PCT/EP2012/062578
§ 371 (c)(1),
(2), (4) Date: Mar. 28, 2014

(87) PCT Pub. No.: WO2013/001006
PCT Pub. Date: Jan. 3, 2013

(65) Prior Publication Data
US 2014/0221600 A1    Aug. 7, 2014

(30) Foreign Application Priority Data

Jun. 30, 2011 (EP) .................................... 11172231
Jun. 30, 2011 (EP) .................................... 11172233

(51) Int. Cl.
| | | |
|---|---|---|
| *B29D 22/00* | (2006.01) | |
| *C08G 69/26* | (2006.01) | |
| *B29C 55/12* | (2006.01) | |
| *C08G 69/36* | (2006.01) | |
| *C08J 5/18* | (2006.01) | |
| *B29C 55/06* | (2006.01) | |
| *B32B 27/34* | (2006.01) | |
| *B29D 23/00* | (2006.01) | |
| *B29K 77/00* | (2006.01) | |

(52) U.S. Cl.
CPC ................. *C08G 69/26* (2013.01); *B29C 55/06* (2013.01); *B29C 55/12* (2013.01); *B32B 27/34* (2013.01); *C08G 69/265* (2013.01); *C08G 69/36* (2013.01); *C08J 5/18* (2013.01); *B29K 2077/00* (2013.01); *B32B 2307/518* (2013.01); *B32B 2307/54* (2013.01); *B32B 2307/7244* (2013.01); *C08J 2377/00* (2013.01)

(58) Field of Classification Search
CPC ....................................................... C08G 69/26
USPC ........ 428/36.91, 336; 264/233, 291; 528/323, 528/344, 346, 347
See application file for complete search history.

(56) References Cited

U.S. PATENT DOCUMENTS 3,983,306 A * 9/1976 Nielinger et al. .......... 428/476.9

FOREIGN PATENT DOCUMENTS

DE    198 14 924    10/1999

OTHER PUBLICATIONS

Nylon Plastics Handbook, Edited by Melvin I. Kohan, Hanser Publishers, Section 11.3, pp. 365-377 (1995).
International Search Report for PCT/EP2012/062578, mailed Sep. 11, 2012.

* cited by examiner

*Primary Examiner* — Terressa Boykin
(74) *Attorney, Agent, or Firm* — Nixon & Vanderhye P.C.

(57) ABSTRACT

This invention relates to a biaxially stretched product comprising a copolyamide comprising monomeric units of: aliphatic non-cyclic diamines X and aliphatic non-cyclic dicarboxylic acids Y or aliphatic non-cyclic α,ω-amino acids Z, and diamines M and diacids N in an amount between 0.1 to 2 wt % based on the total amount of copolyamide, and in which M and N are cyclic, and wherein the product has been stretched at a temperature of between the glass transition temperature (Tg) and the melting temperature (Tm). A method of preparation is claimed, as well as a multilayer film comprising the biaxially stretched product.

14 Claims, No Drawings

BI-AXIALLY STRETCHED PRODUCT

This application is the U.S. national phase of International Application No. PCT/EP2012/062578, filed 28 Jun. 2012, which designates the U.S. and claims the benefit from EP Application No. 11172231.0, filed 30 Jun. 2011; and EP Application No. 11172233.6, filed 30 Jun. 2011, the entire contents of each of which are hereby incorporated by reference.

This invention relates to a bi-axially stretched product and method of preparation of these products and films thereof.

Bi-axially stretched products are known and for example described in DE19814924A1. This document describes bi-axially oriented tubular films with at least one layer of a copolyamide made up of (a) 90-98 wt % units derived from epsilon-caprolactam and (b) 10-2 wt % units derived from equimolar amounts of a diamine and a aromatic dicarboxylic acid.

A disadvantage of these films is that relatively large amounts of the diamines and the dicarboxylic acids are employed, which is disadvantageous for mechanical properties, as well as barrier properties.

It is thus an object of the present invention to provide a bi-axially stretched product with improved mechanical properties.

Surprisingly this object has been achieved by providing a biaxially stretched product comprising a copolyamide comprising monomeric units of:
  aliphatic non-cyclic diamines X and aliphatic non-cyclic dicarboxylic acids Y or aliphatic non-cyclic α,ω-amino acids Z, and
  diamines M and diacids N in an amount between 0.1 to 2 wt % based on the total amount of copolyamide, and in which M and N are cyclic, and
wherein the product has been stretched at a temperature of between the glass transition temperature (Tg) and the melting temperature (Tm). It was surprisingly found that upon presence of diamines M and diacids N in these low amounts and where M and N are cyclic, a biaxially stretched product could be obtained, which exhibited less rupture upon preparation and allowed for higher production speeds. Moreover the copolyamide showed good mechanical properties, i.e. a low yield (sigma yield) and a high elongation at break (epsilon break), which allowed the biaxially stretched product to be produced with less costs.

Copolyamides are known and generally described in Nylon Plastics Handbook, Edited by Melvin I. Kohan, Hanser Publishers, 1995, pages 365 and further.

The nomenclature is adhered to as used in Nylon Plastics Handbook, Edited by Melvin I. Kohan, Hanser Publishers, 1995; e.g. PA-612 denotes a homopolymer with building blocks hexane-1,6-diamine and 1,12-dodecanoic acid, PA-6/12 denotes a copolymer made from ϵ-caprolactam and laurolactam and a blend of PA-6 and PA-12 is described as PA-6/PA-12.

Polyamide homopolymers can for example be made from a diamine (X) and a diacid (Y) and are generally known as an AABB type polyamide, e.g. PA-612 denotes a homopolymer with building blocks hexane-1,6-diamine (HMDA) and 1,12-dodecanoic acid. Polyamide homopolymers can also be made from an amino acid (Z) are generally known as AB-type polyamide, e.g. PA-6 denotes a homopolymer from ϵ-caprolactam.

A copolyamide is usually described as either PA-XY/MN, wherein PA-XY is a AABB type polyamide, or PA-Z/MN, wherein PA-Z is an AB-type polyamide and wherein M and N are present in lower amounts than the first mentioned monomeric units. This notation is silent about the type of copolyamide. The copolyamide can thus be random, block or even alternating.

The bi-axially stretched product has been stretched at a temperature between the glass transition temperature (Tg) and the melting temperature (Tm) of the copolyamide. Preferably, the bi-axially stretched product has been stretched at a temperature between the glass transition temperature (Tg) and the crystallization temperature (Tc) of the copolyamide. Examples of these stretching processes are continuous planar stretching processes. Typically in these planar processes, a polymer melt leaving a rectangular slit is quenched to a film in the glassy phase on e.g. a cold metal chill role to prevent crystallization of the material as much as possible. Downstream in the process the film material is heated to above Tg and below Tm, for example to a temperature in the range between 60 to 130° C. for polyamide 6, and at these temperatures the film is biaxially stretched in-plane.

Tm and Tg can be determined by a calorimetric technique according to ASTM 11357-3 and ASTM 3418-3 respectively.

This planar stretching may occur in a sequential fashion where stretching first occurs in machine direction (MD) consequently followed by a stretching step in transverse (TD) direction. MD stretching may occur by leading and heating the film over roller sets where stretching occurs by a difference in relative rotation speed of the different roller sets. TD stretching is e.g. performed downstream in an air oven system. TD stretching may occur by moving the film in a tenter frame device in which the films is clamped at the sides. By the specific geometry of the tenter frame system the film is stretched in perpendicular direction by moving the film through the setup.

Planar stretching may also occur in a manner in which in-plane stretching of the films occurs in both planar directions simultaneously. This can be performed in specific tenter frame systems designed in such a way that stretching occurs indeed in both directions simultaneously. Heating occurs normally by hot air.

In these planar processes, more downstream the film might undergo a heat set step.

Another class of biaxial stretching processes is formed by the continuous tubular stretching processes. A prominent example is the double bubble process. In this process usually a melt of a polymer is blown in first instance into a tubular film in the melt. This film can then be quenched by for example a cold water bath and in a second step this tubular film is blown to a larger bubble at temperatures above Tg and below Tm, such as between 60 and 140° C. for PA6. This second step also reflects a biaxial stretching step since the diameter of the bubble is increased as well as the length of the bubble. These stretching steps may be followed by additional annealing and heat set steps. Typical degree of stretching for PA6 in these processes is a factor of two to four in both planar directions. For other polyamides this degree of stretching might be different. For instance, for PA46 degree of stretching may less than 2 and for PA4T it may be between 2 and 3.

The biaxially stretched product might be in the form of a film, optionally combined with other films forming a multilayer film. This can for example be accomplished by lamination to form the film end product.

Thermoforming is yet another class of biaxially stretching at a temperature of between the glass transition temperature (Tg) and the melting temperature (Tm) of the copolyamide. This involves for example heating a film by e.g. infrared heating or metal contact and consequently the film is transformed into a 3D geometry by stretching against a mold surface. This transformation might be carried out in a one-step process by e.g. vacuum forming, drape forming or pressure forming as described in e.g. J. L. Throne, Technology of Thermoforming, Hanser Publishers, ISBN 3-446-17812-0. Two- or even multi-step forming processes can be applied in combination with e.g. plug-assist methods. Dependant on the geometry of the end product, the character of the stretching process may vary over the position of the sample.

Typically PA6 based foils applied for thermoform processes are of a multilayer character meaning a non-stretched PA6 foil is combined with other films of other materials by for example a lamination technology. These other materials might be polyolefins, modified polyolefins, copolymers of ethylene and vinylalcohol, or others. The biaxially stretched product according to this invention, can be advantageously used in a multilayer product.

Aliphatic Non-cyclic Monomeric Units X, Y and Z

The copolyamide in the bi-axially stretched product comprises aliphatic non-cyclic diamines X and aliphatic non-cyclic dicarboxylic acids Y or aliphatic non-cyclic α,ω-amino acids Z.

Preferably the sum of X+Y is at least 70 wt % with respect to the total amount of copolyamide or at least 70 wt % of Z, more preferably the sum of X+Y or Z is at least 80 wt %, even more preferred at least 90 wt %. The term non-cyclic denotes a structure wherein no ring of atoms is present. Weight percentages are denoted with respect to the total amount of copolyamide, unless denoted otherwise.

The aliphatic non-cyclic monomeric units can either be of the AB-type, thus having at least one amine group and at least one acid group, also denoted as aminoacid and herein referred to as Z. Examples of AB-type aliphatic non-cyclic monomeric units are epsilon-caprolactam, aminodecanoic acid, aminoundecanoic acid and aminododecanoic acid.

The aliphatic non-cyclic monomeric units can also be diamines and diacids, thus of the AA and BB type, herein denoted as X and Y. Examples of aliphatic non-cyclic diamines X include 1,4-diaminobutane, 1,5-diaminopentane, 1,6-diaminohexane. Examples of aliphatic non-cyclic diacids Y include 1,6-hexanedioic acid, 1,8-octanedioic acid, 1,9-nonanedioic acid, 1,11-decanedioic acid, undecandioic acid, 1,12-dodecanedioic acid, 1,13-tridecanedioic acid, 1,14-tetradecanedioic acid, 1,15-heptadecanedioic acid, 1,16-hexadecanedioic acid, 1,17-septadecanedioic acid and 1,18-octadecandioic acid.

Preferably the molar ratio X:Y is between 1.1:1 and 1:1.1 as then higher molecular weights are reached.

Preferably, the aliphatic non-cyclic monomeric units are
i. ε-caprolactam for Z or
ii. 1,6-diaminohexane for X and 1,6-hexanedioic acid for Y,
as these aliphatic non-cyclic monomeric units are readily available.

The aliphatic non-cyclic monomeric units can also be a mixture of AB-type and AA-type and BB-type monomers.

Embodiment where X is 1,4-Diaminobutane

In another embodiment the biaxially stretched product comprising a copolyamide comprising monomeric units of X being 1,4-diaminobutane, and Y being an aliphatic non-cyclic dicarboxylic acid with at least 8 carbon atoms. Preferably the monomeric unit of aliphatic non-cyclic dicarboxylic acid Y has at most 18 carbon atoms. More preferably the monomeric unit of aliphatic non-cyclic dicarboxylic acid Y is chosen from the group of 1,8-octanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid and 1,18-octadecanedioic acid. Even more preferably the monomeric unit of aliphatic non-cyclic dicarboxylic acid has an even number of carbon atoms, as this results in a relatively higher melting point of the copolyamide. Most preferred, the monomeric unit of aliphatic linear dicarboxylic acid is 1,10-decanedioic acid. Preferably, the viscosity number of the copolyamide wherein X is 1,4-diaminobutane and Y is an aliphatic non-cyclic dicarboxylic acid with at least 8 carbon atoms, is at least 100, more preferably at least 110, even more preferred at least 120, as this gives a better melt strength.

Preferably, the viscosity number is between 130 and 190. The viscosity number is determined according to ISO 307 Fifth edition 2007 May 15 by dissolving the copolyamide in formic acid (c=0.005 g/mL) at 25° C. and measuring of the viscosity number with the aid of an Ubelohde viscometer (Scott type 530-10/1), with the relationship between viscosity number and relative viscosity being VN=200*(relative viscosity −1). Biaxially stretched product comprising this copolyamide exhibits favourable toughness, together with low overall stress levels.

Monomeric Units of Diamines M and Diacids N

The copolyamide in the bi-axially stretched product according to the invention comprises diamines M and diacids N in a total amount between 0.1 to 2 wt % based on the total amount of copolyamide and in which M and N are cyclic.

Surprisingly it has been shown that already these amounts exhibit an improvement of toughness and lower overall stress levels in a bi-axially stretched product. Preferably, the total amount of M+N is less than 1.9 wt %, more preferably less than 1.8 wt %, even more preferably less than 1.5 wt %. The total amount of M+N is at least 0.1 wt %, more preferably at least 0.2 wt %, even more preferably at least 0.5 wt %. Most preferred the sum is between 0.2 and 1.5 wt %. Preferably, the molar ratio M:N is between 2:1 and 1:2, more preferably between 1.2:1 and 1:1.2.

Cyclic diamines M include aromatic and non-aromatic diamines such as for example diaminocylohexane, isophoronediamine (IPD), bis-(p-aminocyclohexane)methane (PACM), 2,2-Di-(4-aminocyclohexyl)-propane, 3,3'-dimethyl-4-4'-diaminodicyclohexylmethane, p-xylylenediamine, m-xylylenediamine, 3,6-bis(aminomethyl)norbornane.

Cyclic diacids N include aromatic diacids such as isophthalic acid (I), terephthalic acid (T), 4-methylisophthalic acid, 4-tert-butylisophthalic acid, 1,4-naphthalenedicarboxylic acid and 2,6-naphthalenedicarboxylic acid. Cyclic diacids N also include non-aromatic cyclic diacids such as cis-1,4-cyclohexanedicarboxylic acid, trans-1,4-cyclohexanedicarboxylic acid, cis-1,3-cyclohexanedicarboxylic acid and trans-1,3-cyclohexanedicarboxylic acid.

Preferably, the cyclic diacids N are aromatic diacids. More preferably, the cyclic diacids N are isophthalic acid and/or terephthalic acid.

Most preferred the cyclic diamine M is isophoronediamine and the cyclic diacid N is terephthalic acid.

Most preferred, the aliphatic non-cyclic monomeric units are
i. ε-caprolactam for Z or
ii. 1,6-diaminohexane for X and 1,6-hexanedioic acid for Y, and M is isophoronediamine (IPD) and N is terephthalic acid (T) in an amount between 0.1 and 2 wt % based on the total amount of the copolyamide.

The copolyamide can comprise the usual additives such as branching agents, branched monomeric units, endcappers as well as other monomeric units, different from X, Y or Z.

Method for Preparation of the Bi-axially Stretched Product:

The copolyamide of the bi-axially stretched product may be prepared by hydrolytic copolymerization of at least the aliphatic monomeric units X and Y, or Z, the diamines M and diacids N and optionally, subsequently a solid state postcondensation step, as known from the state of the art. After preparation of the copolyamide, a product is made, which is subsequently stretched by any of the processes described above, either as monolayer or multilayer. The process according to the invention can be performed quicker, as less rupture occurs, which allows for a broader processing window.

Use of Bi-axially Stretched Product

The bi-axially stretched product can be advantageously used in packaging industry as film, either mono- or multilayer or as a thermoformed product.

EXPERIMENTS

Preparation of the (Co)Polyamides
PA-6

A 10 L autoclave at room temperature was charged with 6.0 kg of solid ε-caprolactam and 90 g water and was inertisized three times with $N_2$. The autoclave was closed and the mixture was heated up to 270-275° C. and kept under pressure for 2 hours. The pressure was slowly released to 0 barg, while the temperature was kept at 270° C. The mixture remained at 270° C. in this postcondensation phase for 6 hours while degassing, before the reactor was emptied and the extruded string was granulated. The unextracted granules had a relative solution viscosity in sulphuric acid of 2.84. The obtained granules were three times extracted for three hours with water at 100° C. to remove the residual monomers and oligomers. In a static bed reactor, the extracted granules were dried and postcondensed for 14 hours at 130° C. under an $N_2$ stream of 35 $m^3$/h. The solid state postcondensed granules had a relative solution viscosity in sulphuric acid of 3.23.

Comparative PA-6/66 with 3.0 wt % 66

A 10 L autoclave at room temperature was charged with 4.559 kg of solid ε-caprolactam and 68 g water and was inertisized three times with $N_2$ and subsequently heated to 90° C. In a separate vessel 151 g of 66-salt was dissolved in 101 g water at 90° C. and subsequently charged to the autoclave. The autoclave was closed and the mixture was heated up to 270-275° C. and kept under pressure for 2 hours. The pressure was slowly released to 0 barg, while the temperature was kept at 270° C. The mixture remained at 270° C. in this postcondensation phase for 6 hours while degassing, before the reactor was emptied and the extruded string was granulated. The unextracted granules had a relative solution viscosity in sulphuric acid of 2.77. The obtained granules were three times extracted for three hours with water at 100° C. to remove the residual monomers and oligomers. In a static bed reactor, the extracted granules were dried and postcondensed for 16 hours at 150° C. under an $N_2$ stream of 35 $m^3$/h. The solid state postcondensed granules had a relative solution viscosity in sulphuric acid of 3.32.

Comparative PA-6/6T with 3.5 wt % 6T

A 10 L autoclave at room temperature was charged with 4.236 kg of solid ε-caprolactam and was inertisized three times with $N_2$ and subsequently heated to 80° C. In a separate vessel 97 g of T powder was suspended in 300 g ε-caprolactam and then added to the autoclave. Subsequently 68 g of HMDA was dissolved in 71 g water at 70° C. and charged to the autoclave. The autoclave was closed and the mixture was heated up to 270-275° C. and kept under pressure for 2 hours. The pressure was slowly released to 0 barg, while the temperature was kept at 270° C. The mixture remained at 270° C. in this postcondensation phase for 6 hours while degassing, before the reactor was emptied and the extruded string was granulated. The unextracted granules had a relative solution viscosity in sulphuric acid of 2.71. The obtained granules were three times extracted for three hours with water at 100° C. to remove the residual monomers and oligomers. In a static bed reactor, the extracted granules were dried and postcondensed for 20 hours at 155° C. under an $N_2$ stream of 35 $m^3$/h. The solid state postcondensed granules had a relative solution viscosity in sulphuric acid of 3.19.

PA-6/IPDT with 1 wt % IPDT

A 10 L autoclave at room temperature was charged with 4.653 kg of solid ε-caprolactam and 68 g water and was inertisized three times with $N_2$ and subsequently heated to 90° C. In a separate vessel 24.5 g of T powder was added to a solution of 25.1 g of IPD in 116 g water at 60° C. When the IPDT-salt solution was clear (ca. 15 minutes) it was charged to the autoclave. The autoclave was closed and the mixture was heated up to 270-275° C. and kept under pressure for 2 hours. The pressure was slowly released to 0 barg, while the temperature was kept at 270° C. The mixture remained at 270° C. in this postcondensation phase for 6 hours while degassing, before the reactor was emptied and the extruded string was granulated. The unextracted granules had a relative solution viscosity in sulphuric acid of 2.66. The obtained granules were three times extracted for three hours with water at 100° C. to remove the residual monomers and oligomers. In a static bed reactor, the extracted granules were dried and postcondensed for 20 hours at 150° C. under an $N_2$ stream of 35 $m^3$/h. The solid state postcondensed granules had a relative solution viscosity in sulphuric acid of 3.40.

TABLE 1 properties of the (co)polyamides prepared

| PA-6/MN | Z (% sum of M and N) | RSV (SA) |
|---|---|---|
| Comparative PA-6 | 0 | 3.23 |
| Comparative PA-6/66 | 3.0 | 3.32 |
| Comparative PA-6/6T | 3.5 | 3.19 |
| PA-6/IPDT | 1 | 3.40 |

Uniaxial Stretching Studies and Oxygen Permeability

Cast films were produced by a film cast process, during this process the melt was quenched at a chill role of 25° C. During experimentation, measures were taken to prevent moisture uptake of the films as much as possible.

Cast films with a width of 75 mm and a thickness of approximately 150 micrometer were uniaxially stretched by a factor 3. The stretching process occurred by leading the film over two stretching units; each stretching unit was composed of 5 metal roles with a diameter of 72 mm each. The film was transferred over the first stretching unit with a speed of 3.0 m/min; the speed of the $2^{nd}$ stretching unit amounted to 9.0 m/min which lead to an intrinsic degree of stretching of 3. The length of the stretching zone amounted to 190 mm. In the series of experiments as described in the table below, the last three roles of the first stretching device were heated to the temperature as given in the table. Under the given conditions, the time between first film contact with the first heated role and leaving the last heated role amounted to 8.9 seconds. The stretching force was measured and normalized with respect to film thickness. The thickness of the film was measured at six positions over the width of the film and averaged giving a thickness in the range 140-160 micrometer. For good comparison the force is normalized with respect to film thickness and calculated back for each experiment to a film thickness of 150 micrometer with a linear dependency between initial film thickness and force. This normalized film thickness is expressed in Table 2.

TABLE 2

Uniaxial stretching results

| T in °C. | F in N Comparative PA6 rel visco 3.0 | F in N Comparative PA6 rel visco 3.0 | F in N Comparative PA6 rel visco 3.2 | F in N Comparative PA-6/66 | F in N According to invention PA-6/IPDT | F in N Comparative PA-6/6T |
|---|---|---|---|---|---|---|
| 50 | 144 | 150 | 166 | 144 | 167 | 172 |
| 55 | 114 | 117 | 126 | 123 | 133 | 130 |
| 60 | 87 | 79 | 82 | 85 | 94 | 104 |
| 65 | 88 | 72 | 73 | 68 | 74 | 73 |
| 70 | 106 | 82 | 123 | 70 | 62 | 58 |
| 75 | 178 | 143 | 197 | 94 | 66 | 54 |
| 80 | 204 | 200 | 213 | 163 | 116 | 71 |
| 85 |  |  |  | 200 | 185 | 123 |
| 91 |  |  |  |  |  | 185 |

Table 2 clearly shows that the processing windows of PA-6/IPDT (1 wt % IPDT) and PA-6/6T (3.5 wt % 6T) are bigger than for PA6 or PA6/66. Cyclic monomeric units such as IPD and T are apparently more effective in broadening this processing window compared to non-cyclic monomeric units such as 66. When both the diamine and the diacid are cyclic (PA-6/IPDT) the effect is biggest, as there with much lower amounts better stretching results were obtained.

Oxygen Permeability Studies

Oxygen permeability results as measured at 23+/−0.5° C. and at 85% relative humidity with test gas of 100% oxygen on a sample area of 5 $cm^2$ according to standard norm D3985-05. Results are shown in Table 3.

TABLE 3

Oxygen permeability results in cc mm/($m^2$ day atm)

| monomer weight fraction [wt %] | P(85% RH) PA-6/IPDT | P(85% RH) Comparative PA-6/6T | P(85% RH) Comparative PA-6/66 |
|---|---|---|---|
| 0 | 2.62 | 2.62 | 2.62 |
| 1 | 2.5 |  |  |
| 2 |  |  |  |
| 3 |  |  | 2.7 |
| 3.5 |  | 2.45 |  |
| 4 | Comparative: 2.09 |  |  |
| 5 |  | 2.48 |  |
| 6 |  |  |  |
| 7 | Comparative: 1.96 |  |  |
| 15 |  | 2.04 |  |
| 17 |  |  | 3.21 |

From table 3 it is clear that the oxygen permeability decreases for copolyamides containing cyclic monomeric units, with respect to polyamide 6 (for which the oxygen permeability is 2.62, as can be seen in the row of 0% monomer weight fraction).

Oxygen permeability remains very low for PA-6/IPDT, whereas for PA-6/6T and PA-6/66 these values are only obtained by much larger quantities of monomers. Even at only 1 wt % of IPDT, the copolyamide exhibits an oxygen permeability of only 2.5 cc mm ($m^2$ day atm), whilst other copolyamides need higher amounts to obtain a similar result.

Testing of the Mechanical Performance of Films

The cast films were tested perpendicular to the stretching direction offline on a Zwick Z050 tensile testing machine to assess their performance in a sequential stretching operation. Amorphous uniaxially stretched films were stored dry and at low temperatures to avoid crystallization of the film. Films which were stretched at two different temperatures were tested: 50° C. where the differences in inline stretching force for the various materials is negligible and 80° C. where a strong difference in stretching force is observed. Copolymers show a lower stretching force at higher temperatures as compared to the homopolymer. Small dumbbell shaped samples were punched from the film and tested at two temperatures at around, and somewhat above the typical glass transition temperature of polyamide, i.e. 65° C. and 80° C. respectively. Care was taken to minimize the exposure of the samples to moisture and temperature to avoid any crystallization of the samples prior to testing. The dumbbells were clamped in the tensile testing machine of which one of the clamps is equipped with a hot stage, set to the respective testing temperature, to assure that the samples are at testing temperature within the order of a second. The testing was performed at a relatively high tensile speed of 1000 mm/min to avoid the influence of crystallization due to temperature during the experiment.

TABLE 4

| sample | test temperature | σ yield [Mpa] | s.d. [Mpa] | ε yield [%] | s.d. [Mpa] | σ break [Mpa] | s.d. [Mpa] | ε break [%] | s.d. [Mpa] |
|---|---|---|---|---|---|---|---|---|---|
| Comp A - PA6 V3 50° C. | 65° C. | 17.9 | 2.5 | 5.7 | 0.4 | 57.2 | 8.18 | 505.5 | 54.5 |
| Comp B - PA6 V3 80° C. |  | 22.7 | 2.02 | 5.6 | 1.3 | 48.7 | 5.83 | 409.6 | 49.9 |
| Exp 1 PA-6/IPDT V3 50° C. |  | 15.4 | 2.11 | 6.2 | 0.7 | 47.7 | 7.57 | 572.6 | 56.3 |
| Exp 2 PA-6/IPDT V3 80° C. |  | 21.8 | 4.77 | 7.2 | 2.3 | 50.7 | 6.87 | 530.6 | 56.7 |
| Comp C - PA-6/6T V3 50° C. |  | 23.1 | 3.63 | 4.8 | 0.4 | 42.3 | 2.79 | 548.2 | 38.3 |
| Comp D - PA-6/6T V3 80° C. |  | 24.9 | 3.25 | 6.6 | 1.1 | 46.2 | 2.69 | 507.4 | 25.5 |
| Comp E - PA6 V3 50° C. | 80° C. | 12.7 | 2.24 | 5.5 | 0.5 | 46 | 1.79 | 486 | 30.9 |
| Comp F - PA6 V3 80° C. |  | 23.8 | 4.77 | 6.9 | 1.3 | 48.5 | 2.5 | 398.8 | 15.9 |
| Exp 3 PA-6/IPDT V3 50° C. |  | 12.9 | 1.84 | 5.9 | 0.7 | 48.7 | 4.36 | 540.6 | 28.6 |
| Exp 4 PA-6/IPDT V3 80° C. |  | 11.7 | 2.58 | 8.4 | 1.5 | 46.6 | 5.98 | 525.5 | 38.5 |
| Comp G - PA-6/6T V3 50° C. |  | 13.9 | 2.55 | 5.2 | 0.7 | 34.7 | 3.54 | 481.3 | 38.9 |
| Comp H - PA-6/6T V3 80° C. |  | 12.6 | 1.59 | 6.7 | 0.8 | 42.2 | 5.65 | 504.5 | 59.9 |

*For amounts see table 1.

The results as presented in Table 4 clearly show that the films of copolyamide PA-6/IPDT show good mechanical properties, i.e. a low yield (sigma yield) and a high elongation at break (epsilon break), as is seen in Exp 1 to 4. A low yield in combination with a high elongation at break are indicators that less rupture occurs upon biaxial stretching, which allows for a broad processing window.

For PA-6/6T only comparable mechanical properties were observed when more than 3 times as much monomers were present, as is seen in Comparative examples C, D, G and H. The comparative examples A, B, E and F are a homopolymer which results in less favourable sigma yield and epsilon break.

The combination of a higher elongation at break and a low sigma yield is favourable as this combines sufficient toughness of the material with low overall stress level in the material, as well as less rupture during processing. Table 4 clearly indicates that the film according to the invention surprisingly results in both a low sigma yield and a high elongation at break while only employing low amounts of monomeric units of cyclic diamines and/or cyclic acids.

The invention claimed is:

1. A biaxially stretched product comprising a copolyamide comprising monomeric units of:
   (i) aliphatic non-cyclic diamines X and aliphatic non-cyclic dicarboxylic acids Y or aliphatic non-cyclic α,ω-amino acids Z, and
   (ii) diamines M and diacids N in an amount between 0.1 to 1.5 wt % based on the total amount of copolyamide, and in which M and N are cyclic, wherein
   the product has been stretched at a temperature of between the glass transition temperature (Tg) and the melting temperature (Tm).

2. The biaxially stretched product according to claim 1, in which N is selected from the group consisting of isophthalic acid (I), terephthalic acid (T), 4-methylisophthalic acid, 4-tert-butylisophthalic acid, 1,4-naphthalenedicarboxylic acid and 2,6-naphthalenedicarboxylic acid.

3. The biaxially stretched product according to claim 1, in which M is selected from the group consisting of isophoronediamine (IPD), bis-(p-aminocyclohexane)methane (PACM), 2,2-Di-(4-aminocyclohexyl)-propane, 3,3'-dimethyl-4-4'-diaminodicyclohexylmethane, p-xylylenediamine, m-xylylenediamine, and 3,6-bis(aminomethyl)norbornane.

4. The biaxially stretched product according to claim 1, wherein
   (a) M is selected from the group consisting of isophoronediamine (IPD), bis-(p-aminocyclohexane)methane (PACM), 2,2-Di-(4-aminocyclohexyl)-propane, 3,3'-dimethyl-4-4'-diaminodicyclohexylmethane, p-xylylenediamine, m-xylylenediamine, and 3,6-bis(aminomethyl)norbornane, and
   (b) N is selected from the group consisting of isophthalic acid (I), terephthalic acid (T), 4-methylisophthalic acid, 4-tert-butylisophthalic acid, 1,4-naphthalenedicarboxylic acid and 2,6-naphthalenedicarboxylic acid, cis-1,4-cyclohexanedicarboxylic acid, trans-1,4-cyclohexanedicarboxylic acid, cis-1,3-cyclohexanedicarboxylic acid and trans-1,3-cyclohexanedicarboxylic acid.

5. The biaxially stretched product according to claim 1, wherein Z is selected from the group consisting of ε-caprolactam, aminodecanoic acid, aminoundecanoic acid and aminododecanoic acid.

6. The biaxially stretched product according to claim 1, wherein X is selected from the group consisting of 1,4-diaminobutane, diaminopentane and hexamethylene diamine.

7. The biaxially stretched product according to claim 1, whereinany of the claims 1 to 4, wherein Y is chosen from the group of 1,6-hexanedioic acid, 1,8-octanedioic acid, 1,9-nonanedioic acid, 1,11-decanedioic acid, undecandioic acid, 1,12-dodecanedioic acid.

8. The biaxially stretched product according to any one of the claims 1-4, wherein Z is ε-caprolactam.

9. The biaxially stretched product according to claim 1, wherein X is hexamethylene diamine and Y is hexamethylene diacid.

10. The biaxially stretched product according to claim 1, wherein the monomeric units of cyclic diamines of M is isophorone diamine and the monomeric units of cyclic diacids of N is terephthalic acid.

11. The biaxially stretched product according to claim 1, wherein Z is ε-caprolactam and wherein M is isophorone diamine and N is terephthalic acid.

12. The biaxially stretched product according to claim 1, wherein X is 1,4-diaminobutane and Y is an aliphatic non-cyclic dicarboxylic acid with at least 8 carbon atoms.

13. A method for preparation of a biaxially stretched product according to claim 1, comprising the steps of:
   (A) preparing a copolyamide comprising:
      (i) aliphatic non-cyclic diamines X and aliphatic non-cyclic dicarboxylic acids Y or aliphatic non-cyclic α,ω-amino acids Z, and
      (ii) cyclic diamines M and cyclic diacids N in an amount between 0.1 to 1.5 wt % based on the total amount of copolyamide, and
   (B) subsequently making a product from the copolyamides followed by stretching the product at a temperature of between the glass transition temperature (Tg) and the melting temperature (Tm) of the copolyamide.

14. A multilayer film comprising at least one layer of the biaxially stretched product according to claim 1.

* * * * *